(12) United States Patent
Chae

(10) Patent No.: US 11,568,853 B2
(45) Date of Patent: Jan. 31, 2023

(54) VOICE RECOGNITION METHOD USING ARTIFICIAL INTELLIGENCE AND APPARATUS THEREOF

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 295 days.

(21) Appl. No.: 16/942,644

(22) Filed: Jul. 29, 2020

(65) Prior Publication Data

US 2021/0049996 A1 Feb. 18, 2021

(30) Foreign Application Priority Data

Aug. 16, 2019 (KR) .................. 10-2019-0100453

(51) Int. Cl.
| | | |
|---|---|---|
| *G10L 13/033* | (2013.01) | |
| *G10L 15/18* | (2013.01) | |
| *G10L 15/22* | (2006.01) | |
| *G06N 5/04* | (2006.01) | |
| *G06N 20/00* | (2019.01) | |

(52) U.S. Cl.
CPC .............. *G10L 13/033* (2013.01); *G06N 5/04* (2013.01); *G06N 20/00* (2019.01); *G10L 15/1815* (2013.01); *G10L 15/22* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 10,878,835 | B1* | 12/2020 | Pedruzzi | ................. G10L 15/02 |
| 2002/0128838 | A1* | 9/2002 | Veprek | ................ G10L 21/0364 |
| | | | | 704/E21.009 |
| 2006/0271371 | A1* | 11/2006 | Tsuboi | .................... G10L 13/10 |
| | | | | 704/277 |
| 2007/0094029 | A1* | 4/2007 | Saito | ...................... G10L 13/033 |
| | | | | 704/260 |
| 2011/0172989 | A1* | 7/2011 | Moraes | .............. G06Q 30/0251 |
| | | | | 704/260 |
| 2012/0053937 | A1* | 3/2012 | Cao | ......................... G10L 15/26 |
| | | | | 704/235 |

(Continued)

*Primary Examiner* — Jonathan C Kim
(74) *Attorney, Agent, or Firm* — Birch, Stewart, Kolasch & Birch, LLP

(57) ABSTRACT

Disclosed is a voice recognition method and apparatus using artificial intelligence. A voice recognition method using artificial intelligence may include: generating a utterance by receiving a voice command of a user; obtaining a user's intention by analyzing the generated utterance; deriving an urgency level of the user on the basis of the generated utterance and prestored user information; generating a first response in association with the user's intention; obtaining main vocabularies included in the first response; generating a second response by using the main vocabularies and the urgency level of the user; determining a speech rate of the second response on the basis of the urgency level of the user; and outputting the second response according to the speech rate by synthesizing the second response to a voice signal.

17 Claims, 11 Drawing Sheets

(56) References Cited

U.S. PATENT DOCUMENTS

| | | | |
|---|---|---|---|
| 2016/0163332 A1* | 6/2016 | Un | G06F 40/30 |
| | | | 704/260 |
| 2016/0210985 A1* | 7/2016 | Deleeuw | G06F 40/40 |
| 2017/0083281 A1* | 3/2017 | Shin | G10L 13/033 |
| 2018/0032884 A1* | 2/2018 | Murugeshan | G06F 40/35 |
| 2018/0114521 A1* | 4/2018 | Hwang | G10L 25/84 |
| 2018/0366104 A1* | 12/2018 | Qian | G06F 3/167 |
| 2019/0318758 A1* | 10/2019 | Ma | G10L 21/04 |
| 2019/0354630 A1* | 11/2019 | Guo | G10L 15/08 |
| 2019/0394289 A1* | 12/2019 | Lehrian | H04L 67/306 |
| 2020/0186482 A1* | 6/2020 | Johnson, III | H04L 12/1818 |
| 2020/0193264 A1* | 6/2020 | Zavesky | G06N 20/00 |
| 2020/0272407 A1* | 8/2020 | Saito | G10L 15/22 |
| 2020/0302913 A1* | 9/2020 | Marcinkiewicz | G10L 13/033 |
| 2020/0312352 A1* | 10/2020 | Kamiyama | G10L 25/63 |
| 2021/0049996 A1* | 2/2021 | Chae | G10L 15/1815 |
| 2021/0142783 A1* | 5/2021 | Kim | G10L 13/047 |

* cited by examiner

FIG. 8

| User's input | How is the weather today? |
|---|---|
| Feedback content | today, Seoul, Gangnam, morning, weather, sunny, fine dust, 37 micrograms, normal, afternoon, cloudy |
| Main vocabularies | First ranking: morning, sunny, afternoon, cloudy |
| | Second ranking: fine dust, normal |
| | Third ranking: today, Seoul, 37 micrograms |

VOICE RECOGNITION METHOD USING ARTIFICIAL INTELLIGENCE AND APPARATUS THEREOF

CROSS REFERENCE TO RELATED APPLICATION

The present application claims priority to Korean Patent Application No. 10-2019-0100453, filed Aug. 16, 2019, the entire contents of which is incorporated herein for all purposes by this reference.

BACKGROUND OF THE INVENTION

Field of the Invention

The present invention relates to a voice recognition method using artificial intelligence and an apparatus thereof. More particularly, the present invention relates to a voice recognition method using artificial intelligence and an apparatus thereof, wherein a length and a speech rate of a response in association with a voice command received from a user is adjusted according to a user's state by using artificial intelligence.

Description of the Related Art

As technology advances, devices equipped with artificial intelligence (AI) have been widely introduced. Particularly, smart-phones including a voice agent capable of recognizing a voice command of a user by using artificial intelligence and providing a response or service by analyzing the same or IoT (Internet of Things) devices are representative examples.

A voice recognition service provides an optimized answer to a question of a user by using a huge database. However, the voice recognition service provides an answer of the full sentence that is generated according to a preset rule to the user, and when the user is in an urgent state and a rapid and simple answer is required, the user is not satisfied with his or her experience.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an objective of the present invention is to provide a voice recognition method capable of adjusting a length and a speech rate of a response according to a user's state by using artificial intelligence.

Another objective of the present invention is to provide a voice recognition apparatus capable of adjusting a length and a speech rate of a response according to a user's state by using artificial intelligence.

Technical solutions obtainable from the present invention are not limited the above-mentioned technical solutions, and other unmentioned technical solutions can be clearly understood from the following description by those having ordinary skill in the technical field to which the present invention pertains.

In order to achieve the above object, according to one aspect of the present invention, a voice recognition method using artificial intelligence according to some embodiment of the present invention includes: generating an utterance by receiving a voice command from a user; obtaining a user's intention by analyzing the generated utterance; deriving an urgency level of the user on the basis of the generated utterance and prestored user information; generating a first response in association with the user's intention; obtaining main vocabularies included in the first response; generating a second response by using the main vocabularies and the urgency level of the user; determining a speech rate of the second response on the basis of the urgency level of the user; and outputting the second response on the basis of the speech rate by synthesizing the second response to a voice signal.

In some embodiments of the present invention, the prestored user information may include information on a user's schedule, and the deriving of the urgency level of the user may include: calculating the urgency level of the user by using at least one of the user's intention, a sound feature of the voice command, and a relation between the information on the user's schedule and current time.

In some embodiments of the present invention, the deriving of the urgency level of the user may include: calculating the urgency value of the user by using factors and weighting factors respectively assigned to the user's intention, the sound feature of the voice command, and the relation between the information on the user's schedule and the current time.

In some embodiments of the present invention, the using of the sound feature of the voice command may include: using a result obtained by comparing a prestored speech feature of a general voice command of the user and a speech feature of the voice command.

In some embodiments of the present invention, the analyzing of the utterance may include: determining whether the utterance corresponds to a repeat-response type or a general-response type on the basis of a number of input times of the utterance, and the generating of the first response may include: when the utterance corresponds to the repeat-response type, generating a prestored response in association with the utterance as the first response.

In some embodiments of the present invention, the method may further include: receiving a voice command of the user as feedback for the second response output in the voice signal; and modifying the obtaining of the main vocabularies and the deriving of the urgency level according to whether or not the voice command input as the feedback relates to the main vocabularies of the first response but excluded in the second response.

In some embodiments of the present invention, the obtaining of the main vocabularies may include: determining rankings for vocabularies included in the first response according to an importance level, and performing classification on the vocabularies included in the first response.

In some embodiments of the present invention, the determining of the speech rate of the second response on the basis of the urgency level of the user may include: increasing the speech rate of the second response when the urgency level of the user is high.

In order to achieve the above object, according to one aspect of the present invention, a computer program using artificial intelligence according to some embodiment of the present invention is stored in a computer readable recording medium for executing any one method of the voice recognition methods.

In order to achieve the above object, a voice recognition apparatus using artificial intelligence according to one aspect of the present invention includes: a microphone receiving a voice command from a user; a processor generating an utterance by processing the voice command, and generating a response in association with the generated utterance; and an audio output part outputting the response, wherein the processor includes: an intention analysis module obtaining a user's intention by analyzing the generated utterance; an urgency deriving module deriving an urgency level of the user on the basis of the generated utterance and prestored user information; a response generation module generating a first response in association with the user's intention, obtaining main vocabularies included in the first response, and generating a second response on the basis of the obtained main vocabularies and the urgency level of the user; and a voice synthesis module determining a speech rate of the second response on the basis of the urgency level of the user, and providing a voice signal having the determined speech rate to the audio output unit by synthesizing the second response to the voice signal.

In some embodiments of the present invention, the prestored user information may include information on a user's schedule, and the urgency deriving module may calculate the urgency level of the user by using at least one of the user's intention, a sound feature of the voice command, and a relation between the information on the user's schedule and current time.

In some embodiments of the present invention, the urgency deriving module may calculate the urgency level of the user by using factors and weighting factors respectively assigned to the user's intention, the sound feature of the voice command, and the relation between the information on the user's schedule and the current time.

In some embodiments of the present invention, the urgency deriving module may obtain the sound feature of the voice command by using a result obtained by comparing a prestored speech feature of a general voice command of the user and a speech feature of the voice command.

In some embodiments of the present invention, the intention analysis module may determine whether the utterance corresponds to a repeat-response type or a general-response type on the basis of a number of input times of the utterance, and the response generation module may generate the first response by using a prestored response in association with the utterance when the utterance corresponds to the repeat-response type.

In some embodiments of the present invention, the response generation module may generate the second response by selecting one of a plurality of sentences having the same meaning with lengths different with each other on the basis of the urgency level of the user when the utterance corresponds to the repeat-response type.

In some embodiments of the present invention, the microphone may receive a voice command from the user as feedback for the second response output in the voice signal, and the urgency deriving module and the response generation module may respectively modify the obtaining of the main vocabularies and the deriving of the urgency level according to whether or not the voice command input as the feedback to the response generation module relates to the main vocabularies of the first response which are excluded when generating the second response.

In some embodiments of the present invention, the response generation module may determine rankings for vocabularies included in the first response according to an importance level, and perform classification on the vocabularies included in the first response.

In some embodiments of the present invention, the voice synthesis module may increase the speech rate of the second response when the urgency level of the user is high.

Specific details of other embodiments are included in the detailed description and the drawings.

A voice recognition apparatus and method using artificial intelligence according to embodiments of the present invention can output a response where an abbreviation level and a speech rate vary according to an urgency level of a user. Accordingly, the user under an urgency situation can receive a fast and simple response from the voice recognition apparatus, and thus the user can be satisfied with his or her experience.

Meanwhile, by applying abbreviation to a response by using main vocabularies constituting the response, an accurate response can be provided to the user.

Effects that may be obtained from the present invention will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 8 is a view of a table showing a process of obtaining main vocabularies from a first response;

DETAILED DESCRIPTION OF THE INVENTION

Figure 1:
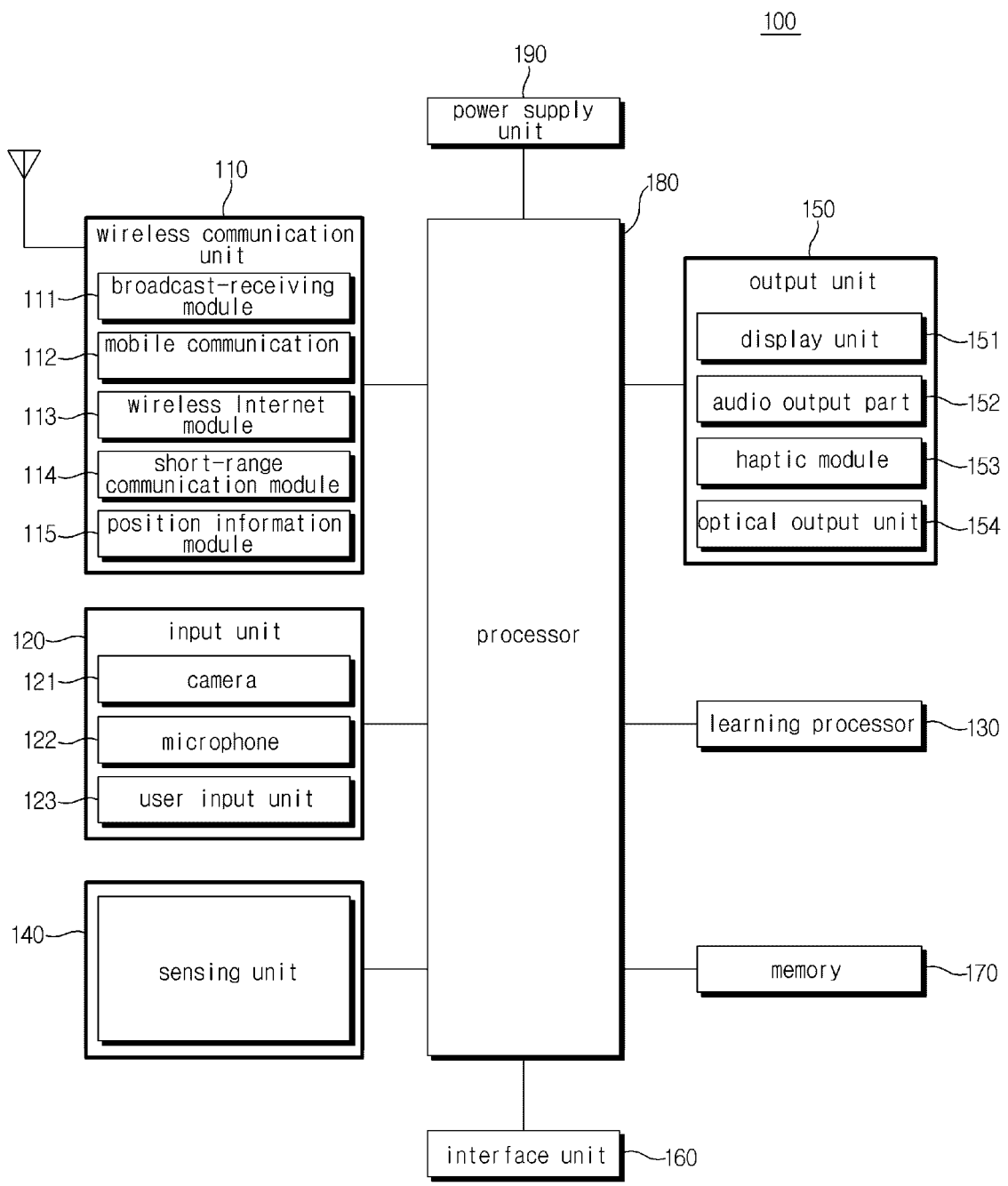
FIG. 1 is a block diagram showing a voice recognition apparatus according to some embodiments of the present invention.

Hereinbelow, exemplary embodiments of the present invention will be described in detail with reference to the accompanying drawings. Throughout the drawings, the same reference numerals will refer to the same or like parts.

The advantages and features of the present invention and methods of achieving them will be apparent from the following exemplary embodiments that will be described in more detail with reference to the accompanying drawings. It should be noted, however, that the present invention is not limited to the following exemplary embodiments, and may be implemented in various forms. Accordingly, the exemplary embodiments are provided only to disclose the present invention and let those skilled in the art know the category of the present invention. In the drawings, embodiments of the present invention are not limited to the specific examples provided herein and are exaggerated for clarity. The same reference numerals or the same reference designators denote the same elements throughout the specification.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

Term used herein are for the purpose of describing particular embodiments only and is not intended to be limiting of the invention. In addition, in an example embodiment, singular expressions used herein include plural expressions unless they have definitely opposite meanings in the context. It will be further understood that the teams "comprises" and/or "comprising", when used herein, specify the presence of stated features, an integer, steps, operations, elements, and/or components, but do not preclude the presence or addition of one Or more other features, an integer, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the scope of the present invention.

Unless otherwise defined, all terms (including technical and scientific terms) used in the present specification may be used as the same meaning which may be commonly understood by the person with ordinary skill in the art, to which the present invention belongs. It will be further understood that terms defined in commonly used dictionaries should not be interpreted in an idealized or excessive sense unless expressly and specifically defined.

The term "module", as used herein, refers to, but is not limited to, a software component, a hardware component, or a combination thereof, such as a field programmable gate array (FPGA) or application specific integrated circuit (ASIC), which performs certain tasks. A module may reside in an addressable storage medium and be executed on one or more processors. For example, a module may include, for instance, software components, object-oriented software components, class components, and task components, processes, functions, attributes, procedures, subroutines, segments of program code, drivers, firmware, microcode, circuitry, data, databases, data structures, tables, arrays, and variables. The functionality provided by these features may be combined into fewer components or separated into further components. In other words, the functionality defined by a module can be partitioned in fairly arbitrary ways between various hardware components, software components, etc.

The steps of a method or algorithm described in connection with the aspects disclosed herein may be embodied directly in hardware, in a software module executed by a processor, or in a combination of the two. A software module may reside in a data memory such as RAM memory, flash memory, ROM memory, EPROM memory, EEPROM memory, registers, a hard disk, a removable disk, a CD-ROM, or any other form of storage medium known in the art. A sample storage medium may be coupled to a machine such as, for example, a computer/processor such that the processor can read information from and write info nation to the storage medium. A sample storage medium may be integral to the processor. The processor and the storage medium may reside in an ASIC. The ASIC may reside in user equipment. In the alternative, the processor and the storage medium may reside as discrete components in user equipment.

FIG. 1 is a block diagram showing a voice recognition apparatus using artificial intelligence according to some embodiments of the present invention.

Referring to FIG. 1, a voice recognition apparatus 100 may include a wireless communication unit 110, an input unit 120, a learning processor 130, a sensing unit 140, an output unit 150, an interface unit 160, a memory 170, a processor 180, and a power supply unit 190.

For the voice recognition apparatus 100 using artificial intelligence described in the present specification, a mobile phone, a smart phone, a laptop PC (laptop computer), an artificial intelligence device for digital broadcasting, a PDA (personal digital assistants), a PMP (portable multimedia player), a navigation device, a slate PC, a tablet PC, a ultrabook, a wearable device (for example, a watch-type artificial intelligence device (smart watch), a glasses-type artificial intelligence device (smart glass), an HMD (head mounted display)), etc. may be included.

However, for the voice recognition apparatus 100 according to an embodiment described in the present specification, fixed-type devices such as a smart TV, a desktop PC, a digital signage, etc. may be included.

In addition, the voice recognition apparatus 100 according to an embodiment of the present invention may be applied to a fixed-type or movable robot.

The voice recognition apparatus 100 according to an embodiment of the present invention may perform a function of a voice agent. The voice agent may be a program of recognizing a user's voice, and outputting in a voice a response appropriated to the recognized user's voice.

The wireless communication unit 110 may include at least one of a broadcasting receiving module 111, a mobile communication module 112, a wireless Internet module 113, a near field communication module 114, and a positional information module 115.

The broadcasting receiving module 111 may receive a broadcasting signal and/or information related to broadcasting from an external broadcasting management server through a broadcasting channel.

The mobile communication module 112 may transmit and receive a wireless signal to/from at least one of a base station, an external terminal, and a server through a mobile communication network that is employed according to technical standards or communication methods for mobile communication (for example, GSM (global system for mobile communication), CDMA (code division multi access), CDMA2000 (code division multi access 2000), EV-DO (enhanced voice-data optimized or enhanced voice-data only), WCDMA (wideband CDMA), HSDPA (high speed downlink packet access), HSUPA (high speed uplink packet access), LTE (long term evolution), LTE-A (long term evolution-advanced), etc.), but the present invention is not limited by the examples of the communication method described above.

The wireless Internet module 113 is a module for wireless Internet access, and may be integrated in or separated from the voice recognition apparatus 100. The wireless Internet module 113 may be configured to transmit and receive a wireless signal over a communication network by using wireless Internet techniques.

Wireless Internet techniques include, for example, WLAN (wireless LAN), Wi-Fi (wireless-fidelity), Wi-Fi direct, DLNA (digital living network alliance), WiBro (wireless broadband), WiMAX (world interoperability for microwave access), HSDPA (high speed downlink packet access), HSUPA (high speed uplink packet access), LTE (long term evolution), LTE-A (long term evolution-advanced), etc., but the present invention is not limited by the examples of wireless Internet technique standards described above.

The near field communication module 114 is for near field communication (short range communication), and near field communication may be provided by using at least one of Bluetooth™, radio frequency identification (RFID), infrared data association (IrDA), ultra-wideband (UWB), ZigBee, near field communication (NFC), Wi-Fi, Wi-Fi direct, and wireless universal serial bus. However, the present invention is not limited by the examples of near field communication methods described above.

The positional information module 1158 is a module for obtaining a position (or current position) of a mobile voice recognition apparatus, and representative examples include a global positioning system (GPS) module or a WiFi module. For example, when the voice recognition apparatus 100 uses a GPS module, a position of the voice recognition apparatus 100 may be obtained by using a signal from a GPS satellite.

The input unit 120 may include a camera 121 for receiving image signals, a microphone 122 for receiving audio signals, and a user input part 123 for receiving information from the user.

Voice data or image data collected in the input unit 120 may be processed as a control command from the user by being analyzed in the processor 180.

The input unit 120 is for receiving image information (or signal), audio information (or signal), data, or information input from the user, and the voice recognition apparatus 100 may include one or a plurality of cameras 121 so as to receive image information.

The camera 121 performs processing on static images or moving images obtained from an image sensor on the basis of an image frame during a video call mode or image capturing mode. The image frame on which processing is performed may be displayed on a display part 151, or stored in the memory 170.

The microphone 122 converts an external audio signal into electrical voice data. In other words, as it will be described in detail later, the voice recognition apparatus 100 may receive a voice command from the user through the microphone 122.

The voice data on which processing is performed may be used in various ways according to a function (or an application program being executed) performed in the voice recognition apparatus 100. Meanwhile, for the microphone 122, various noise removing algorithms may be employed so as to remove noises occurring when receiving external audio signals.

The user input part 123 is for receiving information from the user. When information is input through the user input part 123, the processor 180 may control operations of the voice recognition apparatus 100 so as to respond to the input information. Examples of the above user input part 123 may include a mechanical input means (or, mechanical key, for example, buttons, dome switches, jog wheels, jog switches. etc. which are positioned on front and rear or side surfaces of the mobile terminal 100), and a touch-type input means. In an example, the touch-type input means may be employed by using a virtual key, a soft key, or a visual key displayed on the display part 151 through software processing, or may be employed by using touch keys arranged in a part other than the display part 151. Meanwhile, the virtual key or visual key may be displayed on a touch screen in various forms, for example, may be employed by using graphics, texts, icons, videos or combination thereof.

The learning processor 130 performs data mining, data analysis, intelligent decision making, and mechanical learning algorithm, and may be configured to receive, classify, store, and output information used for the above processes.

The learning processor 130 may include at least one memory unit configured to store data that is received, detected, sensed, generated, and output in a predefined manner or different manner by the voice recognition apparatus 100 using artificial intelligence, or data that is received, detected, sensed, generated, and output in a predefined manner or different manner by another component, a device, or a device performing communication with the voice recognition apparatus 100.

The learning processor 130 may include a memory integrated or employed in the voice recognition apparatus 100. In some embodiments, the learning processor 130 may be employed by using the memory 170.

Selectively or additionally, the learning processor 130 may be employed by using an external memory directly connected to the voice recognition apparatus 100 or by using a memory related to the voice recognition apparatus 100 such as memory provided in a server performing communication with the voice recognition apparatus 100.

In another embodiment, the learning processor 130 may be employed by using a memory provided in a cloud computing environment, or by using a remotely positioned memory that is accessed by the voice recognition apparatus 100 through a communication method such as network.

In order to perform supervised or nonsupervised leaning, data mining, prediction analysis or using another machine, the learning processor 130 may be generally configured to store at least one piece of data in a database so as to identify, index, categorize, manipulate, store, retrieve, and output the data.

Information stored in the learning processor 130 may be used in at least one controller of the processor 180 and the voice recognition apparatus by using some of various different types of data analysis algorithms and machine learning algorithms.

Examples of such algorithms include k-nearest neighbor systems, fuzzy logic (for example, possibility theory), neural networks, Boltzmann machines, vector quantization, pulsed neural nets, support vector machines, maximum margin classifiers, hill-climbing, inductive logic systems, Bayesian networks, petri nets (for example, finite state machines, mealy machines, more finite state machines), classifier trees (for example, perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, etc.

The processor 180 may control the voice recognition apparatus 100 so as to respond to input information.

The processor 180 may determine or predict at least one executable operation of the voice recognition apparatus on the basis of information determined or generated by using data analysis and machine learning algorithm. For the same, the processor 180 may request, retrieve, receive, or use data of the learning processor 130, and control the voice recognition apparatus to execute a predicted or desired operation among the at least one executable operation.

The processor 180 may perform various functions employing intelligent emulation (for example, knowledge-based systems, reasoning systems, and knowledge acquisition systems). In addition, the processor 180 may be applied to various types of systems (for example, fuzzy logic systems) including adaptive systems, machine learning systems, artificial neural networks, etc.

The processor 180 may include sub-modules enabling calculations involving voice and natural speech language processing, such as I/O processing modules, environment condition modules, speech-to-text (STT) processing modules, natural language processing modules, task flow processing modules, and service processing modules.

Each of the above sub-modules may also have access to at least one system or data and models in the voice recognition apparatus, or to a subset or superset thereof. In addition, each of the above sub-modules may provide various functions of vocabulary index, user data, task flow models, service models, and automatic speech recognition (ASR) systems.

In another embodiment, the processor 180 or other aspects of the voice recognition apparatus 100 may be employed with the above sub-modules, systems, or data and models.

In some embodiments, based on data of the learning processor 130, the processor 180 may be configured to detect and sense requirements on the basis of a contextual condition or a user's intention represented in a user's input or natural language input.

The processor 180 may actively generate and obtain information required for fully determining requirements based on the basis of a contextual condition or user's intention. For example, the processor 180 may actively generate information required for fully determining requirements by analyzing historical data including historical input and output, pattern matching, disambiguating words, input intentions, etc.

The processor 180 may determine a task flow for executing a function in response to the requirements on the basis of the contextual condition or user's intention.

The processor 180 may be configured to collect, sense, monitor, obtain, detect, and/or receive signals or data used in data analysis and machine learning operations via at least one sensing component of the voice recognition apparatus so as to collect information for processing and storing in the learning processor 130.

Collecting information may include sensing information through a sensor, obtaining information stored in the memory such as memory 170, or receiving information from another terminal, entity, or an external storage through a communication means.

The processor 180 may collect and store historical usage information in the voice recognition apparatus. The processor 180 may determine a best match for executing a particular function by using the stored historical usage information and prediction modeling.

The processor 180 may receive or sense information of the surrounding environment, or other information through the sensing unit 140.

The processor 180 may receive broadcasting signals and/or broadcasting-related information, wireless signals, wireless data, etc. through the wireless communication unit 110.

The processor 180 may receive image information (or corresponding signal), audio information (or corresponding signal), data, or user input information from the input unit 120.

The processor 180 may collect information in real time, and process or categorize the information (for example, in a knowledge graph, command policy, personalization database, dialog engine, etc.), and store the processed information in the memory 170 or learning processor 130.

When operations of the voice recognition apparatus 100 are determined on the basis of data analysis and machine learning algorithms and techniques, the processor 180 may control the components of the voice recognition apparatus 100 so as to execute the determined operations. In addition, the processor 180 may perform determined operations by controlling the terminal according to a control command.

When performing a specific operation, the processor 180 may analyze history information indicating the execution of the specific operation through data analysis and machine learning algorithms and techniques, and perform updating of previously-learned information on the basis of the analyzed information.

Accordingly, the processor 180, in combination with the learning processor 130, can improve an accuracy of future performance of the data analysis and machine learning algorithms and techniques on the basis of the updated information.

The sensing unit 140 may include at least one sensor for sensing at least one of internal information of the mobile voice recognition apparatus 100, a surrounding environment of the mobile voice recognition apparatus 100, and user information.

For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone (refer to the microphone 122), a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Meanwhile, the mobile voice recognition apparatus 100 described in the present specification may use information in a manner of combining information sensed by at least two sensors of the above sensors.

The output unit 150 is for outputting an audio signal, a video signal, or a tactile signal, and may include at least one of a display part 151, an audio output part 152, a haptic module 153, and an optical output part 154.

The display part 151 displays (outputs) information processed in the voice recognition apparatus 100. For example, the display part 151 may display information on an execution screen of an application program driven in the voice recognition apparatus 100, or user interface (UI) and graphic user interface (GUI) information in response to the information on the execution screen.

The display part 151 may have an inter-layered structure or an integrated structure with a touch sensor so as to be employed in a touch screen. The above the touch screen may provide an output interface between the voice recognition apparatus 100 and a user, as well as functioning as the user input unit 123 that provides an input interface between the voice recognition apparatus 100 and the user.

The audio output part 152 may output audio data received from the wireless communication unit 110 or stored in the memory 170 in a call signal reception mode, a call mode or a record mode, a voice recognition mode, a broadcasting reception mode, etc. Particularly, when the voice recognition apparatus 100 according to an embodiment of the present invention generates a response in a voice signal in association with a user command by synthesizing the response, the audio output part 152 may output the voice signal.

The audio output part 152 may include at least one of a receiver, a speaker, and a buzzer.

The haptic module 153 generates various tactile effects that can be felt by a user. A representative example of tactile effect generated by the haptic module 153 may be vibration.

The optical output part 154 may output a signal for indicating an event generation by using light of a light source of the voice recognition apparatus 100. Examples of events generated in the voice recognition apparatus 100 may include a message reception, a call signal reception, a missed call, an alarm, a schedule notice, an email reception, an information reception through an application, etc.

The interface unit 160 may perform an interface function with various external device connected with the voice recognition apparatus 100. The above interface unit 160 may include at least one of wired or wireless headset ports, external charging ports, wired or wireless data ports, memory card ports, ports for connecting a device having an identification module, audio input/output (I/O) ports, video I/O ports, earphone ports, etc. The voice recognition apparatus 100 may perform an appropriate control associated with a connected external device in response to the external device being connected to interface unit 160.

Meanwhile, the identification module is a chip that stores various pieces of info nation for authenticating authority of using the voice recognition apparatus 100, and may include a user identity module (UIM), a subscriber identity module (SIM), a universal subscriber identity module (USIM), etc. A device having the identification module (referred to as "identification device", hereinafter) may take the form of a smart card. Accordingly, the identification device may be connected with the voice recognition apparatus 100 via the interface unit 160.

The memory 170 may be for storing data supporting various functions of the voice recognition apparatus 100.

In the memory 170, various application programs (or applications) executed in the voice recognition apparatus 100, data for operations of the voice recognition apparatus 100, commands, data for operations of the learning processor 130 (for example, information on at least one algorithm for machine learning) may be stored.

In some embodiments of the present invention, user information for deriving an urgency level of the user may be stored in the memory 170 in advance. The processor 180 may use the information prestored in the memory 170 by loading the information so as to use for deriving the urgency level of the user.

The processor 180 generally controls, in addition to operations related to the above application programs, overall operations of the voice recognition apparatus 100. The processor 180 may provide or process information or functions appropriate for the user in a manner of processing signals, data, information, etc. which are input or output by the above-mentioned components, or by executing the application programs stored in the memory 170.

In addition, the processor 180 may control partial components described with reference to FIG. 1 so as to execute application programs stored in the memory 170. Further, the processor 180 may operate at least two components included in the voice recognition apparatus 100 by combining the same so as to execute application programs.

The power supply unit 190 may receive external power or internal power, and supply appropriate power to respective components included in the voice recognition apparatus 100 by receiving external power under the control of the processor 180.

The power supply unit 190 may include, for example, a battery, and the battery may be an embedded battery or a replaceable battery. Unlikely, the power supply unit 190 may be an adaptor receiving AC power, converting the AC power to DC power, and supplying the DC power to the voice recognition apparatus 100.

Meanwhile, as described above, the processor 180 generally controls operations related to the above application programs, and overall operations of the voice recognition apparatus 100. For example, the processor 180 may set or release a lock state for restricting the user from inputting a control command with respect to applications when a state of the voice recognition apparatus 100 meets a preset condition.

Figure 2:
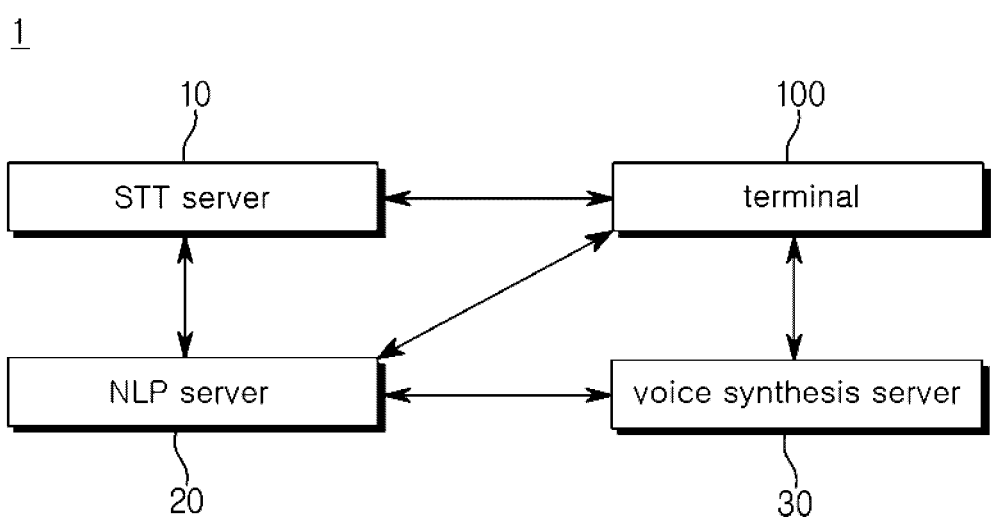
FIG. 2 is a block diagram showing in detail a processor of FIG. 1.

FIG. 2 is a view showing a voice recognition system according to some embodiments of the present invention.

Referring to FIG. 2, a voice recognition system 1 may include a voice recognition apparatus 100, a speech-to-text (STT) server 10, a natural language processing (NLP) server 20, and a voice synthesis server 30.

The wireless communication unit 110 may connect the voice recognition apparatus 100 to a network configured with the STT server 10, the NLP server 20, and the voice synthesis server 30 by using mobile communication or wireless Internet.

The voice recognition apparatus 100 may transmit voice data provided from the user to the STT server 10. The STT server 10 may convert the voice data received from the voice recognition apparatus 100 into text data.

The STT server 10 may improve an accuracy of voice-to-text conversion by using language models. Language models may calculate probabilities of sentences, or may mean models capable of calculating an occurrence probability of a subsequent word when previous words are provided.

For example, language models may include probabilistic language models such as unigram model, bigram model, N-gram model, etc. The unigram model is a model assuming that usage of all words is independent of each other, and is a model calculating a probability of a word column by the product of probabilities of respective words. The bigram is a model assuming that word usage is dependent on one previous word. The N-gram model is a model assuming that word usage is dependent on (n−1) previous words.

In other words, the STT server 10 may determine whether or not text data converted from voice data is appropriately converted by using language models, and thus can improve an accuracy of conversion into text data.

The NLP server 20 may receive text data from the STT server 10. The NLP server 20 may perform intention analysis on the text data on the basis of the received text data. The NLP server 20 may transmit information on the intent analysis which represents a result of the intent analysis to the voice recognition apparatus 100.

The NLP server 20 may generate information on intention analysis by sequentially performing on text data morpheme analysis, syntax analysis, speech act analysis, and dialog processing.

The morpheme analysis is a step of: classifying the text data in association with voice data which is spoken by the user on the basis of a morpheme that is the smallest unit; and determining a part of speech of each morpheme.

The syntax analysis is a step of: classifying the text data into a noun phrase, a verb phrase, an adjective phrase, etc. by using the result of the morpheme analysis; and determining relations between phrases obtained from the classification. The subject, the object, and modifiers of the voice data spoken by the user may be determined through the syntax analysis.

The speech act analysis is a step of analyzing an intention of the voice data spoken by the user by using the result of the syntax analysis. In detail, the speech act analysis is a step of determining an intention of the sentence whether the user asks a question, makes a request, or expresses a simple emotion, etc.

The dialog processing is a step of determining whether to reply with an answer to the user's speech, to respond to the question, or to ask additional information by using the result of the speech act analysis. The NLP server 20 may generate information on intention analysis which includes at least one of replying with an answer to the user's intention, responding to the question, and asking additional information after the dialog processing.

Meanwhile, the NLP server 20 may receive text data from the voice recognition apparatus 100. For example, when the voice recognition apparatus 100 provides a voice-to-test conversion function, the voice recognition apparatus 100 may convert voice data into text data, and transmit the text data to the NLP server 20.

The voice synthesis server 30 may generate synthesized voice data by combining prestored voice data. The voice synthesis server 30 may record voice data of one person selected as a model, and divide the recorded speech into syllables or words. The voice synthesis server 30 may store the voice data that is divided into syllables or words in an internal or external database.

The voice synthesis server 30 may retrieve syllables or words in association with given text data from the database, and generate synthesized voice data by combining found syllables or words.

The voice synthesis server 30 may store a plurality of voice language groups in association with respective languages. For example, the voice synthesis server 30 may include a first voice language group recorded in Korean, and a second voice language group recorded in English.

The voice synthesis server 30 translates text data that is a first language into text data of a second language, and generates synthesized voice data in association with the resulting text data that is the second language by using the second voice language group.

The voice synthesis server 30 may transmit the generated synthesized voice data to the voice recognition apparatus 100. The voice recognition apparatus 100 may output the generated synthesized voice data through the audio output part 152.

The voice synthesis server 30 may receive information on intention analysis from the NLP server 20. The voice synthesis server 30 may generate synthesized voice data in which the user's intention is reflected on the basis of the information on intention analysis.

In some embodiments of the present invention, the STT server 10, the NLP server 20, and the voice synthesis server 30 may be employed in one server.

In the above, description has been made that the STT server 10, the NLP server 20, and the voice synthesis server 30 are independently configured, or configured in one server so as to perform the above functions, but the present invention is not limited thereto. Respective functions of the STT server 10, the NLP server 20, and the voice synthesis server 30 may be performed in the voice recognition apparatus 100.

In other words, the voice recognition apparatus 100 may convert voice data into text data, perform intention analysis on the text data, and generate synthesized voice data by combining voice data. For the same, the voice recognition apparatus 100 may include a plurality of processors.

Figure 3:
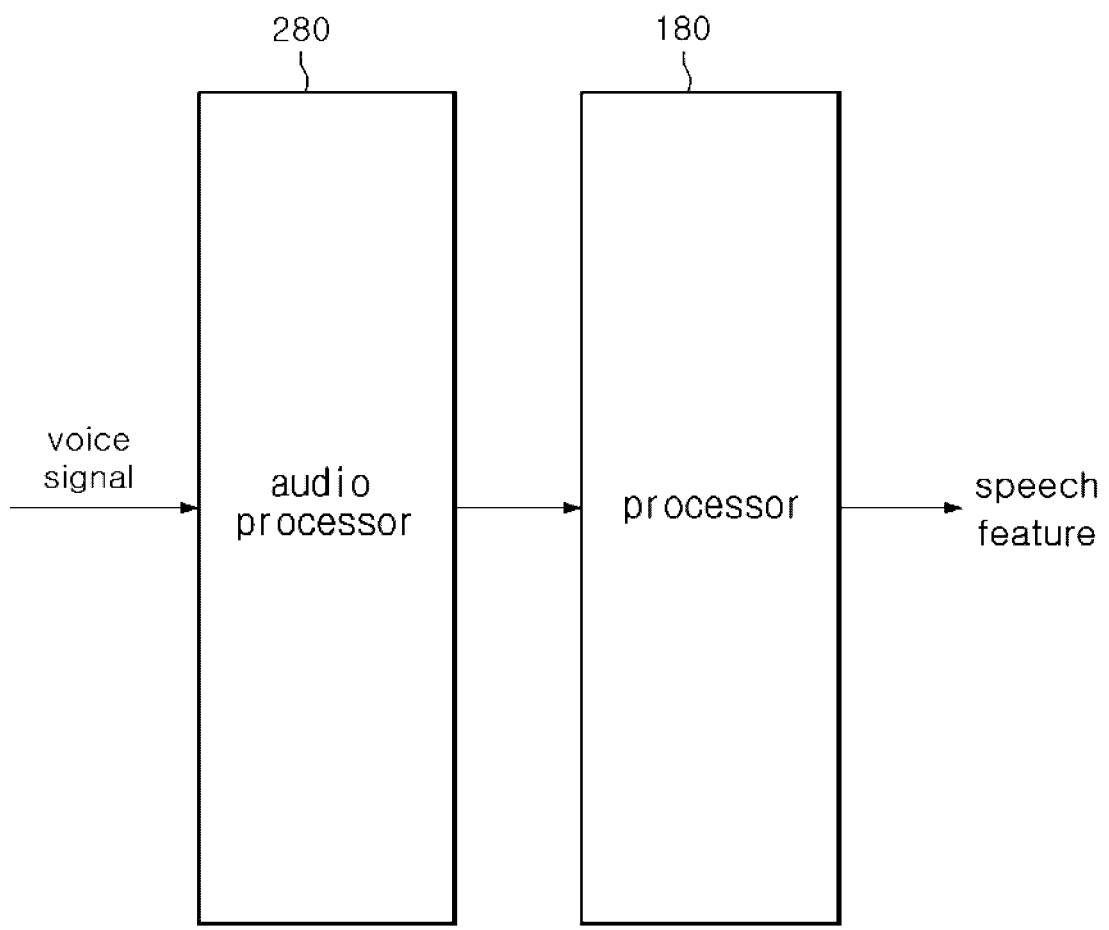
FIG. 3 is a view showing a process of obtaining a speech feature of the user from a voice signal according to some embodiments of the present invention.

FIG. 3 is a view showing a process of obtaining a speech feature of the user from a voice signal according to some embodiments of the present invention.

The voice recognition apparatus 100 shown in FIG. 1 may further include an audio processor 280.

The audio processor 280 may be employed in a chip separate from the processor 180, or may be employed in a chip included in the processor 180.

The audio processor 280 may remove noises from a voice signal. The audio processor 280 may convert a voice signal into text data. For the same, the audio processor 280 may include an STT engine.

The audio processor 280 may recognize a wakeup word that activates voice recognition of the voice recognition apparatus 100. The audio processor 280 may convert a wakeup word received through the microphone 122 into text data, and when the resulting text data is text data in association with a prestored wakeup word, it may be determined that the wakeup word has been recognized.

The audio processor 280 may represent the voice signal from which noises are removed in a power spectrum. The power spectrum may be a parameter indicating which frequency components are included in a waveform where amplitudes in a waveform of the voice signal vary in time. The power spectrum shows the distribution of squared values of amplitudes along a frequency domain of the waveform of the voice signal. The above is described with reference to FIG. 4.

Figure 4:
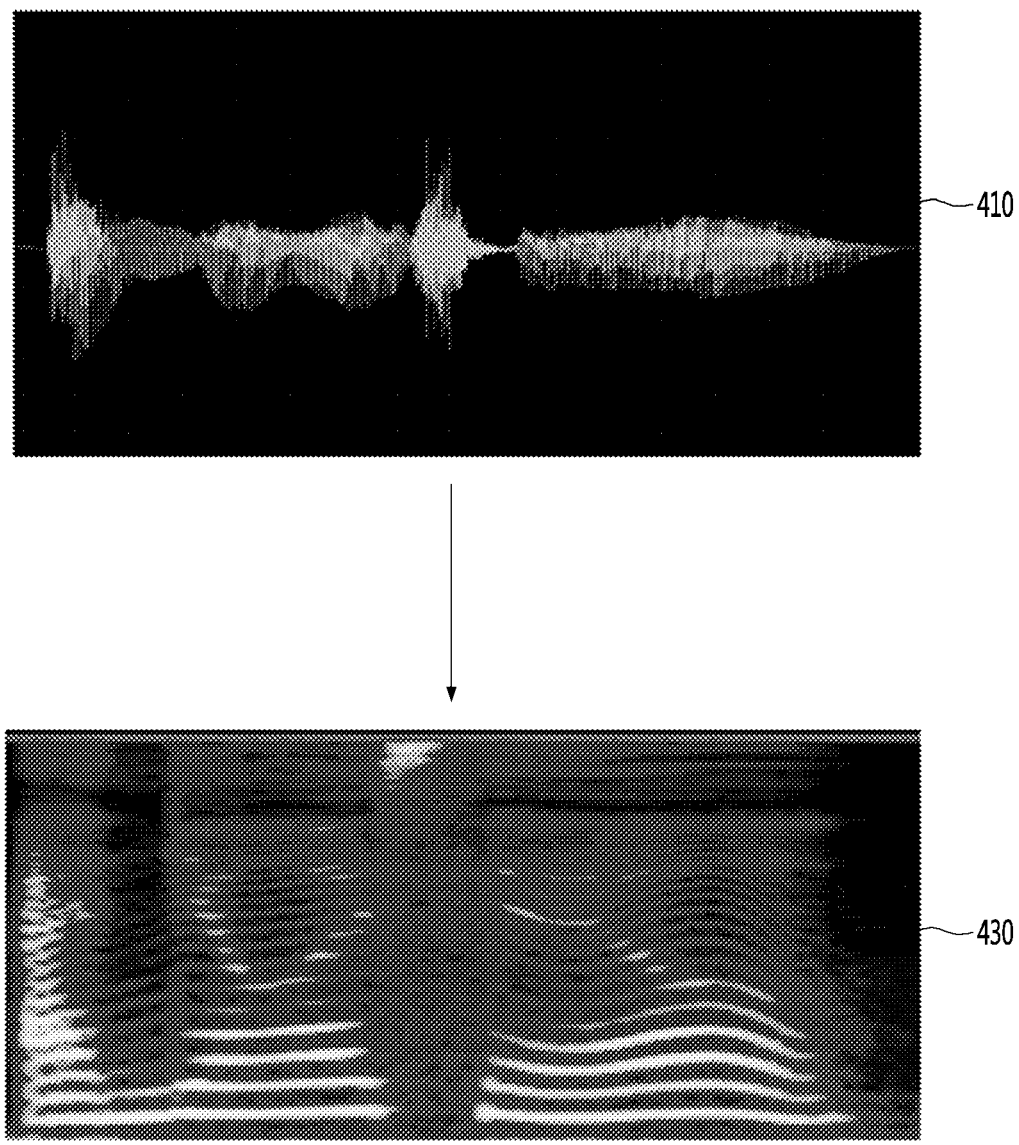
FIG. 4 is a view of an example of showing a voice signal in a power spectrum according to an embodiment of the present invention.

FIG. 4 is a view of an example of showing a voice signal in a power spectrum according to an embodiment of the present invention.

Referring to FIG. 4, a voice signal 410 is shown. The voice signal 410 may be received through the microphone 122, or may be a signal prestored in the memory 170. An x-axis of the voice signal 410 may represent time and a y-axis may represent the size of the amplitude.

The audio processor 280 may convert the x-axis of the voice signal 410 which represents time into a frequency domain 430 representing a power spectrum. The audio processor 280 represents the voice signal 410 in the power spectrum 430 by using Fast Fourier Transform (FFT). An x-axis of the power spectrum 430 represents a frequency value and a y-axis represents squared values of the amplitudes.

Describing again with reference to FIG. 3, the processor 180 may determine a speech feature of the user by using at least one of text data transferred from the audio processor 280, and the power spectrum 430. The speech feature of the user may include a user's gender, a pitch value of a user's sound, a user's tone, a theme of a user's speech, a user's speech rate, a volume of a user's voice, etc.

The processor 180 may obtain a frequency and amplitude in association thereto of the voice signal 410 by using the power spectrum 430. In other words, the processor 180 may obtain an energy value of the voice signal 410 from the power spectrum 430.

The processor 180 may determine a user's gender who has spoken the speech by using a frequency band of the power spectrum 430.

For example, the processor 180 may determine a user's gender as male when a frequency band of the power spectrum 430 is within a preset first frequency band range. The processor 180 may determine a user's gender as female when a frequency band of the power spectrum 430 is within a preset second frequency band range. Herein, the second frequency band range may be wider than the first frequency band range.

The processor 180 may determine a pitch value of a voice by using a frequency band of the power spectrum 430. For example, the processor 180 may determine a pitch value of the voice according to a size of the amplitudes within a specific frequency band range.

The processor 180 may determine a user's tone by using a frequency band of the power spectrum 430. For example, the processor 180 may determine a frequency band having a size of amplitude equal to or greater than a predetermined size as a main voice range of the user among frequency bands of the power spectrum 430, and determine the determined main voice range as the user's tone.

The processor 180 may determine a user's speech rate from the resulting text data by using a number of syllables spoken per unit time The processor 180 may determine the user's speech theme from the resulting text data by using a bag-of-words model.

The bag-of-words model is a process of obtaining main usage words on the basis of a number of word occurrences in a sentence. In detail, the bag-of-words model obtains a unique word within a sentence, represents a number of occurrences of each obtained word in a vector, and determines a speech theme.

For example, the processor 180 may classify a speech theme of the user into the exercise field when words such as <running>, <physical strength>, etc. frequently occur in text data.

The processor 180 may determine the speech theme of the user from text data by using known text categorization. The processor 180 may obtain a keyword from text data, and determine the speech theme of the use by using the keyword.

The processor 180 may determine a volume of the user's voice by using information on amplitude in the entire frequency band. For example, the processor 180 may determine a volume of the user's voice by using an average or weighted average in each frequency band of the power spectrum.

The processor 180 may calculate a speech feature of a general voice command of the user, and store the feature in the memory 170. For example, the processor 180 may calculate an average value of a plurality of voice commands of the user, and store the average value in the memory 170. Calculating the "average value" may be understood to use as data the average value obtained by converting each speech feature into a numerical value. In addition, the processor 180 may compare a speech feature of a general voice command of the user with a speech feature of a voice command of the user which is currently input.

Functions of the audio processor 280 and the processor 180 described with reference to FIGS. 3 and 4 may be performed in any one server of the NLP server 20, and the voice synthesis server 30. For example, the NLP server 20 may obtain a power spectrum by using a voice signal, and determine a speech feature of the user by using the obtained power spectrum.

Figure 5:
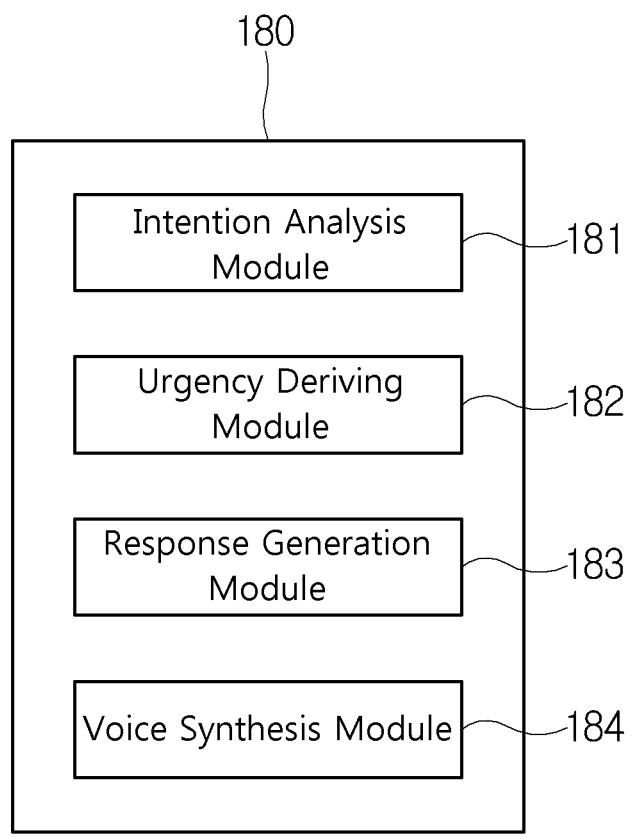
FIG. 5 is a block diagram showing a configuration of the processor according to some embodiments of the present invention.
Figure 6:
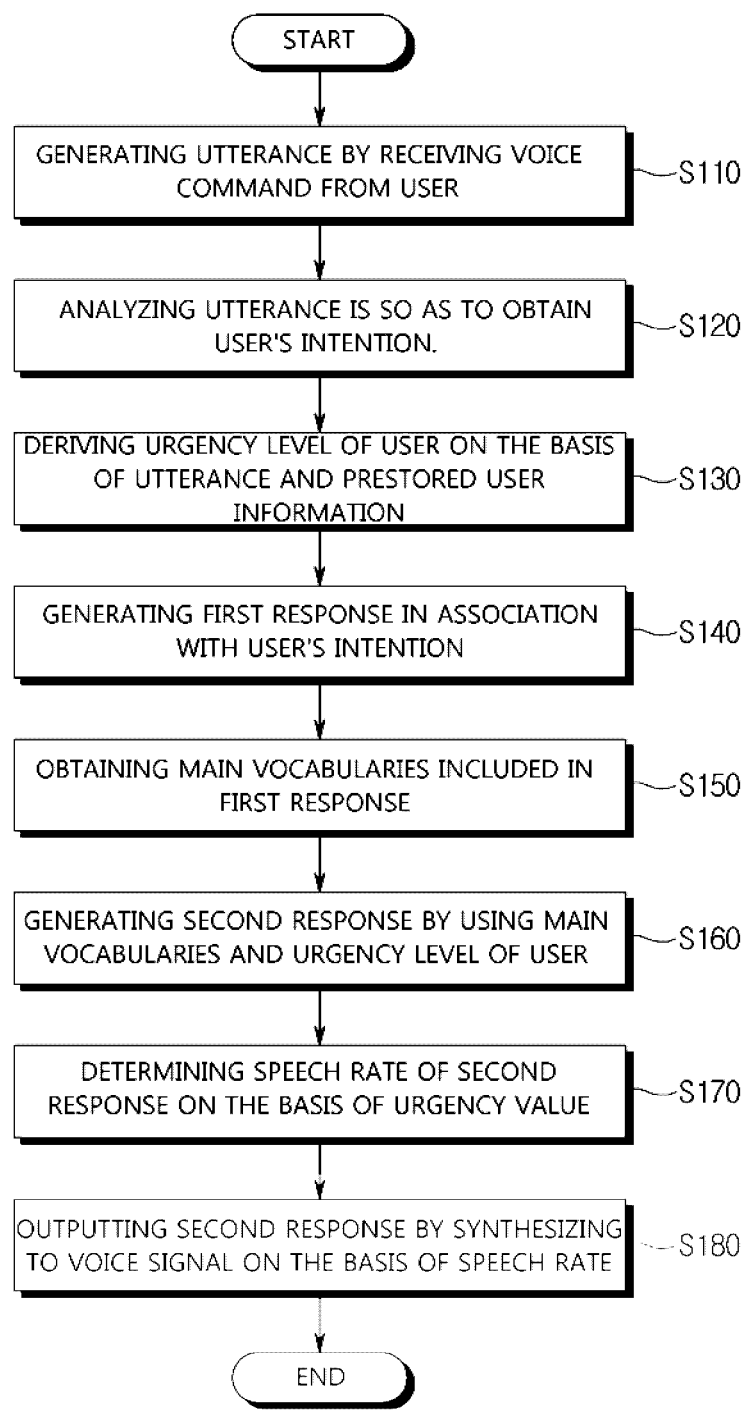
FIG. 6 is a view of a flowchart showing a voice recognition method according to some embodiments of the present invention.

FIG. 5 is a block diagram showing a configuration of the processor according to some embodiments of the present invention, and FIG. 6 is a view of a flowchart showing a voice recognition method according to some embodiments of the present invention.

Referring to FIG. 5, the processor 180 may include an intention analysis module 181, an urgency deriving module 182, a response generation module 183, and a voice synthesis module 184. Functions performed in respective modules will be described with reference to a flowchart of FIG. 6.

Referring to FIG. 6, a voice recognition method according to some embodiments of the present invention includes S110 of generating an utterance by receiving a voice command from the user.

The processor 180 may convert voice data received through the microphone 122 into an utterance, and provide the utterance to the intent analysis module 181. In another embodiment, the STT server 10 may convert voice data received from the voice recognition apparatus 100 into an utterance, and return the utterance to the voice recognition apparatus 100.

The generated utterance may be a form of text data configured with at least one sentence, and may be temporarily stored in the memory 170 before the processor 180 processes the utterance.

Subsequently, in S120, the utterance is analyzed so as to obtain a user's intention.

The intention analysis module 181 analyzes the utterance through natural language processing so as to obtain a user's intention.

For example, the intention analysis module 181 may obtain information on a user's intention by sequentially performing on the utterance morpheme analysis, syntax analysis, speech act analysis, and dialog processing.

In detail, in the morpheme analysis, the intention analysis module 181 may classify the utterance on the basis of a morpheme that is the smallest unit have the meaning, and determine a part of speech of each resulting morpheme.

In the syntax analysis, the intention analysis module 181 may classify the utterance into a noun phrase, a verb phrase, an adjective phrase, etc. by using the result of the morpheme analysis, and determine relations between phrases obtained from the classification. The subject, the object, and modifiers of the voice data spoken by the user may be determined through the syntax analysis.

In the speech act analysis, the intention analysis module 181 may analyze an intention of a voice command spoken by the user by using the result of the syntax analysis. In detail, intention analysis module 181 may determine from the voice command an intention of the sentence whether the user asks a question, makes a request, or expresses simple emotion, etc.

In some embodiments of the present invention, the intent analysis module 181 may determine whether the utterance corresponds to a repeat-response type or a general-response type on the basis of input times of the analyzed utterance.

The repeat-response type is a voice command that is repeatedly input from the user. For example, a question such as "What date is today?", or a voice command such as "Turn on the air conditioner" may correspond thereto.

The general-response type is a voice command that is not frequently asked by the user. For example, a question such as "What is the name of the nearest Chinese restaurant?" may correspond thereto.

The voice recognition apparatus 100 may store a voice command of the user which is obtained from the analyzed utterance or data related to the content of the question, and input times thereof in the memory 170. In the memory 170, for example, a question that is frequently input or the content of the voice command, and input times thereof may be matched and stored in a form of a cache table.

When a user's intention obtained from the analyzed utterance is retrieved from the cache table stored in the memory 17 (cache hit), the intention analysis module 181 may classify the corresponding utterance into a repeat-response type, otherwise, may classify the corresponding utterance into a general-response type.

A question that is frequently input or the content of the voice command which is stored in the memory 170 may be used for generating an input pattern of the user who has input the voice command to the voice recognition apparatus 100, or for generating an input pattern of a user's group using another voice recognition apparatus.

Information on to which response type the utterance belongs may be provided to the response generation module 183 so as to be used for generating a first response and a second response which are provide from the response generation module 183 to the user.

Subsequently, in S130, an urgency level of the user is derived on the basis of the utterance and prestored user information.

The urgency deriving module 182 may derive an urgency level of the user on the basis of the utterance and prestored user information.

The urgency level of the user may be defined to a level of an urgent situation at which the user who has input the voice command is present. Alternatively, the urgency level may be defined as an abbreviation level applied to a response that is expected to be provided from the voice recognition apparatus 100 to the user who has input the voice command.

Hereinafter, a process of deriving an urgency level of the user by the urgency deriving module 182 will be described in detail by using FIG. 7.

Figure 7:
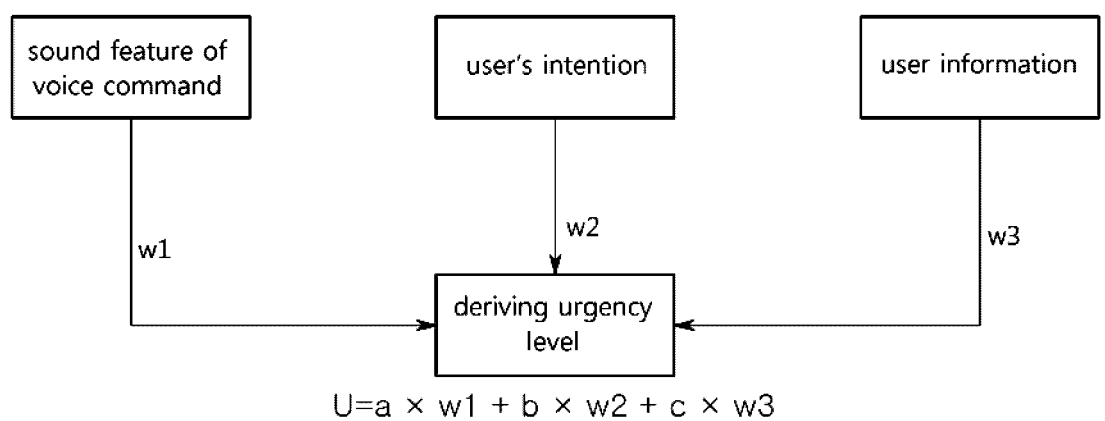
FIG. 7 is a view schematically showing a process of deriving an urgency level from given information by the urgency deriving module.

FIG. 7 is a view schematically showing a process of deriving an urgency level from given information by the urgency deriving module.

Referring to FIG. 7, in detail, the urgency deriving module 182 may assign urgency factors a, b, and c to information obtained from the utterance and prestored user information, and calculate an urgency (U) level by using respective factors and weighting factors w1, w2, and w3 in association thereto.

In detail, the urgency deriving module 182 may derive an urgency level by using the user's intention obtained from the utterance, a sound feature of the voice command, and user information. In detail, the urgency deriving module 182 may assign respective urgency factors to the user's intention obtained from the utterance, a sound feature of the voice command, and user information, and calculate an urgency level by using respective factors and weighting factors in association thereto.

The user's intention corresponds to a user's intention obtained from the utterance by the above-described intention analysis module 181. The urgency deriving module 182 may assign a large value to the urgency factor (for example, a) related to the user's intention when it is determined that the user's intention is important.

In some embodiments, whether or not the user's intention is important may be determined by the intention analysis module 181 when performing natural language processing on the utterance.

The urgency deriving module 182 may use a sound feature of the voice command, for example, a rate of the voice command, a pitch value of the voice command, and energy of the voice command as factors for deriving the urgency level.

Through the above descriptions with reference to FIGS. 3 and 4, the processor 180 may determine a speech feature of the user which includes a user's gender, a pitch value of a user's sound, a user's tone, a user's speech theme, a user's speech rate, a volume of a user's voice, etc.

The sound feature of the voice command used by the urgency deriving module 182 may include a result obtained by comparing a speech feature of a general voice command of the user with a speech feature of the voice command of the user which is currently input.

The result obtained by comparing a speech feature of a general voice command of the user with a speech feature of the voice command of the user which is currently input may be converted into a numerical value and provided to the urgency deriving module 182. The urgency deriving module 182 may derive an urgency level by using the provided comparison result as the urgency factor (for example, b) of the sound feature.

For example, when it is assumed that a speech rate and a volume of a voice command, among speech features of the voice command input from the user, have values greater than those of the general speech feature of the user, the urgency deriving module 182 may determine that a current state of the user, as seen in the speech features of the voice command, is an urgent situation, and assign a large value to the urgency factor b related to the sound feature.

The user information may mean information on the user who has input the voice command. The prestored user information used by the urgency deriving module 182 may include, for example, information on a user's schedule. In detail, the urgency deriving module 182 may derive an urgency level by using a temporal relation between the current time and the information on the user's schedule. The above info/lotion on the user's schedule may be prestored in the memory 170. Alternatively, by a request for information on a user's schedule, the mobile communication module 112 or wireless Internet module 113 may receive the information on a user's schedule from a schedule info/lotion providing server.

For example, it is assumed that a schedule "Lunch with a friend at PM 1:00" is stored as the information on a user's schedule in the memory 170. When the time at which the voice command of the user is input is PM 12:50 so that only 10 minutes remain for the schedule, the urgency deriving module 182 may assign a large value to the factor (for example, c) related to information of a user's schedule.

The urgency deriving module 182 may calculated an urgency (U) level by using weighting factors w1, w2, and w3 in association with a user's intention, a sound feature of a voice command, and information on a user's schedule. In FIG. 5, as an example, an urgency (U) level is calculated by respectively multiplying factors a, b, and c by weighting factors w1, w2, and w3, but the present invention is not limited thereto. Factors other than factors a to c and weighting factors w1 to w3 which are shown in the figure may be added, and an urgency (U) level may be calculated by using another method.

In some embodiments, the urgency deriving module 182 may represent the urgency (U) level calculated as described above by dividing the same into some levels. For example, when the urgency (U) level belongs to a high range among predetermined ranges, the urgency (U) level is classified into a "high level", when the urgency (U) level belongs to an intermediate level, the urgency (U) level is classified into an "intermediate level", and when the urgency (U) level belongs to a low level, the urgency (U) level is classified into a "low level". Herein, it may be understood that users have a high urgency level, an intermediate urgency level, and a low urgency level, respectively.

Referring again to FIG. 6, in S140, a first response in association with the user's intention is generated.

The response generation module 183 may generate a first response in association with the user's intention. The first response is a response responding to the user's intention obtained from the analyzed utterance, and may mean a response in a form on which neither abbreviation nor modification is performed.

The response generation module 183 may determine a task flow for executing a function responding to requirements on the basis of the user's intention or a syntax condition of the utterance, and determine a first response which is a default form of the response so as to output to the user.

In detail, the intention analysis module 181 may determine whether to reply with an answer to a user's speech, to respond to a question, or to ask additional information, and then the response generation module 183 may generate the first response including at least one of replying with the answer to the user's speech, responding to the question, and asking the additional information.

When the intention analysis module 181 determines the utterance of the user as a repeat-response type, a response to the corresponding utterance may be prestored in the memory 170. The response generation module 183 may load the response to the corresponding utterance from the memory so as to generate the same as the first response.

As it will be described later, a sentence in which abbreviation is perform in association with the utterance of a repeat-response type may be also prestored in the memory 170 so that the response generation module 183 may select and load the required response from the memory 170, and generate the same as a second response.

Subsequently, in S150, main vocabularies included in the first response may be obtained.

The response generation module 183 may obtain main vocabularies included in the generated first response.

Obtaining main vocabularies from the first response may be determining rankings for main vocabularies included in the first response, and performing classification on the vocabularies. Related to the above, description will be made in detail with reference to FIGS. 8 and 9.

Figure 9:
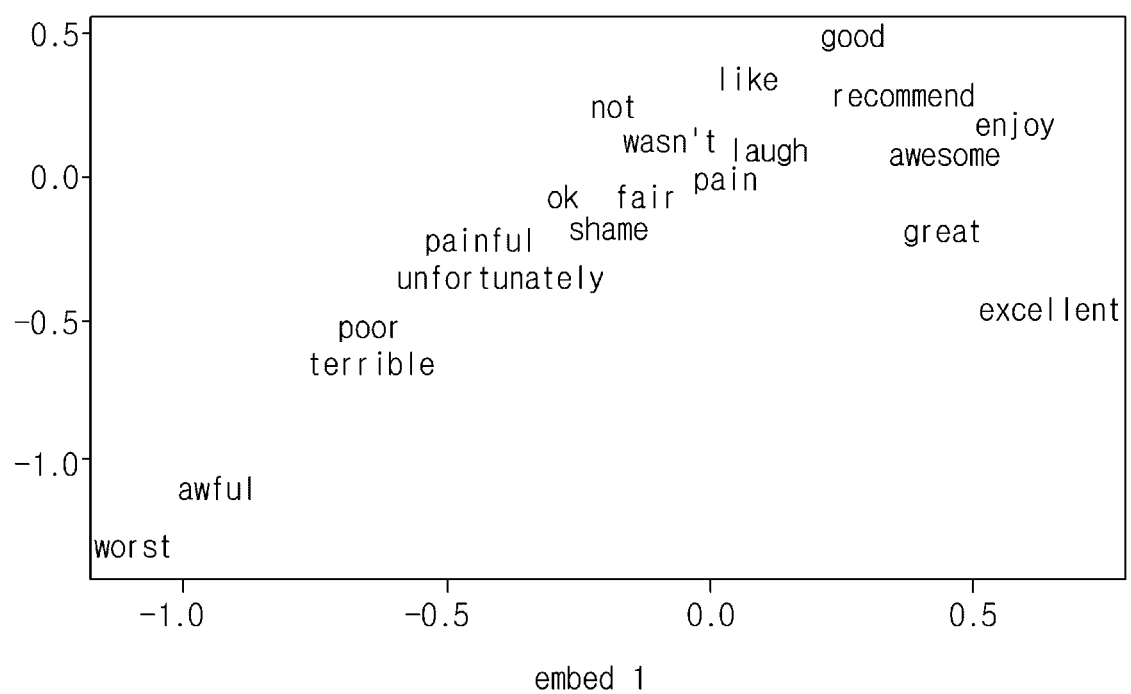
FIG. 9 is a view schematically showing word embedding for obtained main vocabularies.

FIG. 8 is a view of a table showing a process of obtaining main vocabularies from a first response, and FIG. 9 is a view schematically showing performing word embedding on obtained main vocabularies.

Referring first to FIG. 8, a process is shown where rankings are determined for obtained main vocabularies included in a first response in association with a question "How is the weather today?" of the user. The response generation module 183 may perform classification on words used for generating the first response in association with the question.

The response generation module 183 may determine, for example, information priority by using the user's intention included in the utterance. Alternatively, in order to avoid reusing words included in the utterance for a response to the user, words included in the utterance may be classified to have a low importance level. For example, as an example shown in FIG. 8, in a question of "How is the weather today?", in order to avoid reusing a word "today" for a response provided to the user, the word "today" is ranked third in the importance level.

The response generation module 183 may calculate an importance level of a word by using, for example, word embedding models.

In other words, the response generation module 183 may arrange words included in the first response in a vector space as shown in FIG. 9 to respectively have specific coordinates. In FIG. 9, a vector space is represented to be a two dimension, but the present invention is not limited thereto. A vector space for word embedding may be configured with an n dimension (n is a natural number equal to or greater than 2).

For example, within a vector space of FIG. 9, a distance between a word "good" and a word "terrible" may be greater than a distance between a word "good" and a word "like". In other words, similarity between a word "good" and a words "like" may be greater than similarity between a word "good" and a word "terrible".

As above, each word constituting the first response may be represented in a different vector within a vector space, and the response generation module 183 may determine, for example, a word positioned spatially close to words included in the utterance to have a high importance level so as to determine as main vocabularies. However, the present invention is not limited thereto, the response generation module 183 may determine an importance level for each word by applying various rules so as to obtain main vocabularies within a vector space.

Alternatively, the response generation module 183 may calculate a relation level between words on the basis of a number of times where the words are simultaneously mentioned, and use the calculated relation level for determining the importance level. In other words, for words that are frequently and repeatedly mentioned in questions of the user, the response generation module 183 determines that a relation level between them are high, and classify them to have a high importance level.

The processor 180 may determine a number of times where words included in a general voice command of the user are simultaneously mentioned, store the result in the memory 170, and use the result for obtaining main vocabularies. In addition, a number of times where words are simultaneously mentioned may be used as voice input patterns of the user who has input a voice command in the voice recognition apparatus 100, and may also be generated from voice input patterns of a user group using another voice recognition apparatus.

A question that is frequently input or the content of the voice command which is stored in the memory 170 may be used for generating an input pattern of the user who has input the voice command to the voice recognition apparatus 100, or for generating an input pattern of a user's group using another voice recognition apparatus.

By the above process, the result of classifying words included in the first response by importance levels shows, as shown in FIG. 8, that "morning, sunny, afternoon, and cloudy" are ranked first, "fine dust, and normal" are ranked second ranking, and "today, Seoul, and 37 micrograms" are ranked third.

Words classified to have the same ranking may be determined to have the same importance level, and used for generating a second response that will be described below.

When the intention analysis module 181 determines the utterance of the user as a repeat-response type, a response to the corresponding utterance may be prestored in the memory 170. The response generation module 183 may load a response in association with the utterance from the memory, and generate the same as the first response.

Subsequently, in S160, a second response is generated by using the main vocabularies and the urgency level of the user.

The response generation module 183 may generate a second response by using main vocabularies obtained from the first response, and the urgency level provided from the urgency deriving module 182.

The response generation module 183 may determine an abbreviation level of the second response according to an urgency (U) level that is exemplarily calculated in FIG. 7.

For example, when an urgency level corresponds to a high level, a high abbreviation level is applied to the first response so as to generate the second response, when an urgency level corresponds to an intermediate level, a high abbreviation level is applied to the first response so as to generate the second response, and when an urgency level corresponds to a low level, a low abbreviation level is applied to the first response so as to generate the second response or use the first response as it is for the second response.

Applying, by the response generation module 183, different abbreviation levels according to the urgency levels may include selecting main vocabularies according to rankings thereof, and differently selecting a rule for generating a sentence.

For example, in FIG. 8, selecting main vocabularies according to rankings thereof is described by using the result obtained from classifying and ranking words included in the first response by importance levels. When the derived urgency level corresponds to a high level, in order to generate a second response to which a high abbreviation level is applied, unnecessary words may be excluded, and words with a high importance level may be selected. For the same, words "morning, sunny, afternoon, and cloudy" which are ranked first may be selected as words used for generating the second response.

Meanwhile, when the derived urgency level corresponds to an intermediate level, in order to generate a second response to which an intermediate abbreviation level is applied, words "morning, sunny, afternoon, cloudy, fine dust, and normal" which are ranked first and second may be selected as words used for generating the second response.

Finally, when the derived urgency level corresponds to a low level, in order to generate a second response to which a low abbreviation level is applied, "morning, sunny, afternoon, cloudy, fine dust, normal, today, Seoul, and 37 micrograms" which are ranked first, second, and third may be selected as words used for generating the second response. Alternatively, the first response to which an abbreviation level is not applied may be used for the second response.

As a result, when generating the second response to which an abbreviation level is applied according to the urgency level, main vocabularies obtained by the response generation module 183 are used. Accordingly, even though the second response is configured in a sentence by applying an abbreviation level, the second response includes vocabularies with a high importance level, and thus a response with high accuracy can be provided to the user.

The response generation module 183 may differently select a rule for generating a sentence according to an urgency level.

For example, the voice recognition apparatus 100 may store templates for selecting a sentence to which an abbreviation level is applied in the memory 170, and the response generation module 183 may load a template having a length in association with an urgency level from the memory 170, and insert obtained main vocabularies into changeable parts among phrases constituting the template so as to complete a sentence constituting the second response.

Unlike to the above, the response generation module 183 may generate a sentence constituting the second response without using the template. Herein, the response generation module 183 may generate a second response with another abbreviation level by varying a length of a connection word and complexity of a sentence structure according to the urgency level.

When the intention analysis module 181 determines the utterance of the user as a repeat-response type, the response generation module 183 may generate a second response by selecting one of a plurality of preset sentences in association with the utterance of the user.

In detail, the plurality of preset sentences may include other sentences having the same meaning but different lengths. When a set of the above sentences is referred to as a repeat-response group, the response generation module 183 may generate the second response by selecting one of the repeat-response group on the basis of the urgency level of the user.

For example, when the derived urgency level corresponds to a high level, the response generation module 183 may generate the second response by selecting a sentence with the shortest length from the repeat-response group.

When the derived urgency level corresponds to an intermediate level, the response generation module 183 may generate the second response by selecting a sentence with a medium length from the repeat-response group.

When the derived urgency level corresponds to a low level, the response generation module 183 may generate the second response by selecting a sentence with the longest length from the repeat-response group.

As above, the response generation module 183 generates the second response by selecting one of sentences included in the repeat-response group, and thus calculation required for generating the second response can be reduced.

Referring again to FIG. 6, in S170, a speech rate of the second response is determined on the basis of the urgency value.

Related to the speech rate of the second response, description will be made with reference to FIG. 10.

Figure 10C:
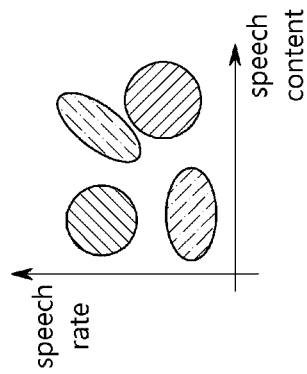
FIGS. 10A to 10C are views schematically showing graphs for determining a speech rate of a second response according to some embodiments of the present invention.
Figure 10B:
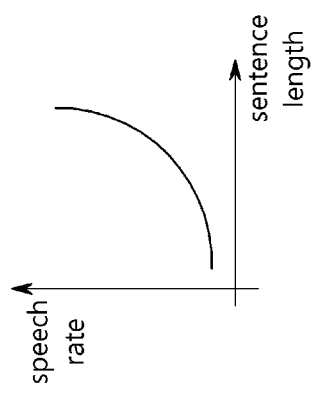
Figure 10A:
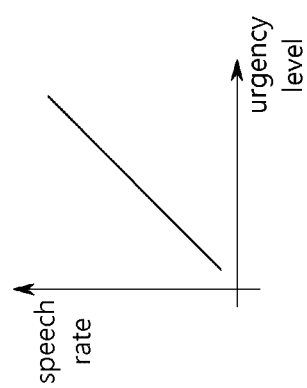

FIGS. 10A to 10C are views schematically showing graphs for determining a speech rate of a second response according to some embodiments of the present invention.

Referring to FIG. 10A, a speech rate of a second response may be determined on the basis of an urgency level of the user. In other words, when an urgency level of the user increases, it may be determined that a speech rate of a second response also increases. Accordingly, when the user is in an urgent situation, the user can obtain desired information by being rapidly provided with the second response configured with a sentence to which an abbreviation level is applied.

In FIG. 10A, it is shown that a linear function is present between an urgency value and a speech rate, but it is an example. A quadratic function or other functions may be present.

Meanwhile, referring to FIG. 10B, a speech rate of a second response may be determined by a length of a sentence constituting the second response. When an urgency level of the user is determined to be a low so that an abbreviation level is not applied to a second response, and the entire sentence is output in a general speech rate, the user may feel frustrated. Herein, the above situation may give a bad effect on the user.

In order to solve the above problem, as shown in FIG. 10B, the speech rate of the second response may be configured to increase according to a sentence length of the second response. Accordingly, a second response configured with a long sentence may be output faster than normal, and thus a rapid response can be provided to the user.

A speech rate of the second response determined on the basis of a sentence length of the second response may increase or decrease a speech rate of the second response determined on the basis of the urgency level of the user.

In FIG. 10B, it is shown that a quadratic function is present between a sentence length and a speech rate, but a linear graph that is, a proportional relation, may be present between the sentence length and the speech rate.

Meanwhile, as shown in FIG. 10C, speech content of a second response may be a factor for determining a speech rate of a second response. When content of the second response generated by the response generation module 183 relates to an urgent issue, a speech rate of the second response may be increased.

Referring again to FIG. 6, in S180, the second response is synthesized to a voice signal on the basis of the speech rate.

The voice synthesis module 184 may receive a second response from the response generation module 183 so as to be synthesized to a voice signal. In detail, the voice synthesis module 184 may encode the second response that is a text form, covert the encoded second response into a set of voice data to which style is applicable, for example, applying style by performing embedding on a cadence related to sound, information, accent and a speech rate on voice data, and generate a voice signal by decoding the voice data to which style is applied.

The voice synthesis module 184 may determine a playback rate of the synthesized voice signal by applying the speech rate of the second response determined before than performing style embedding on the second response.

The voice signal synthesized by the voice synthesis module 184 may be provided to the user by being reproduced as sound by the output unit 150.

As a result, the user can be provided, from the voice recognition apparatus, with a response where an urgency level is reflected which is obtained on the basis of the voice command and prestored user information. Accordingly, the user under an urgent situation can obtain desired information by being provided with a rapid and simple response, and the user under a relaxing situation can obtain accurate information by being provided with a full-length response at a normal speech rate.

Figure 11:
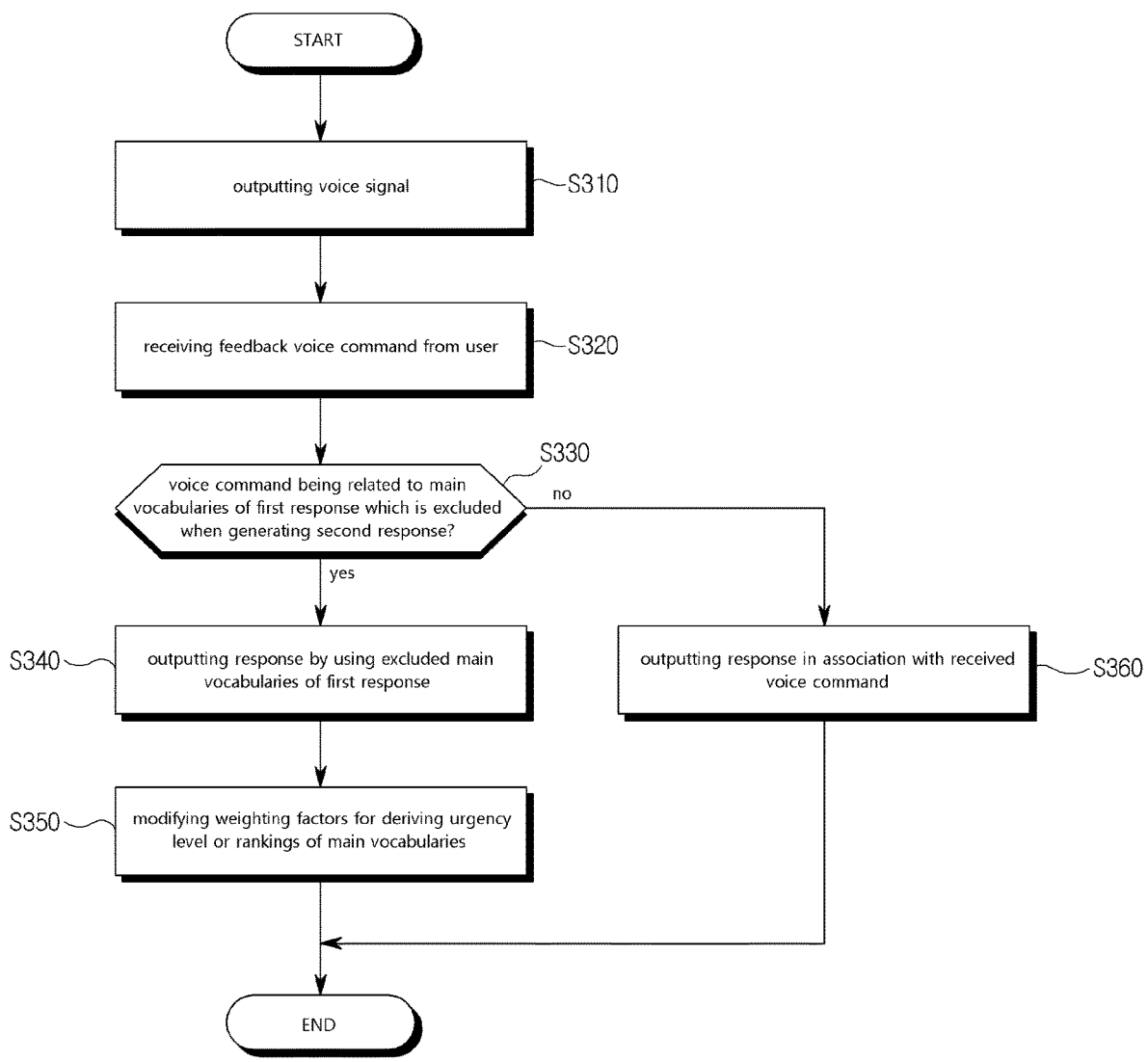
FIG. 11 is a view of a flowchart showing a voice recognition method according to another embodiment of the present invention.

FIG. 11 is a view of a flowchart showing a voice recognition method according to another embodiment of the present invention.

Referring to FIG. 11, a case will be described where a second response is provided to the user in a voice signal, and then the user inputs feedback to the voice recognition apparatus for the second response.

First, in S310, a voice signal is output to the user as a response. In S320, the user listens to the voice signal, and inputs a voice command as feedback to the voice recognition apparatus 100. For example, when the voice recognition apparatus 100 receives a voice command within some seconds after outputting the second response in a voice signal, the voice recognition apparatus 100 determines the received voice command as a feedback voice command, but the present invention is not limited thereto.

Subsequently, in S330, whether or not the voice command received from the user relates to main vocabularies of the first response which are excluded when generating the output second response.

The intention analysis module 181 may generate an utterance from the voice command of the user by natural language processing. The intention analysis module 181 may obtain a user's intention by analyzing the utterance, and determine whether or not the user's intention relates to main vocabularies of the first response which are excluded when generating the second response.

In other words, the intention analysis module 181 may determine whether or not the second response provided to the user relates to words that are not included in the second response by being determined to be unnecessary words among main vocabularies of the first response through the above determination.

When the result is determined that the voice command of the user relates to main vocabularies of the first response which is not output through the second response, in S340, the response generation module 183 and the voice synthesis module 184 output a response by using main vocabularies of the first response but excluded when generating the second response.

Herein, the above corresponds to a case where negative feedback is input from the user, and in S350, the urgency deriving module 182 and the response generation module 183 may respectively perform modification in weighting factors and in rankings for deriving an urgency level and for obtaining main vocabularies.

When the voice command of the user does not relate to the second response or first response, in S360, a response to the input voice command is generated by using processes described with reference to FIG. 6, and the generated response is output to the user.

As described above, a voice recognition method according to another embodiment of the present invention can modify rankings for obtaining main vocabularies and weighting factors for deriving an urgency level when negative feedback is input from the deriving in response to the output second response. In other words, the voice recognition apparatus 100 may perform learning for generating an improved second response by using feedback of the user.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A method of performing voice recognition by using artificial intelligence, the method comprising:

generating an utterance by receiving a voice command from a user;

obtaining a user's intention by analyzing the generated utterance;

deriving an urgency level of the user on the basis of the generated utterance and prestored user information;

generating a first response in association with the user's intention;

obtaining main vocabularies included in the first response;

generating a second response by using the main vocabularies and the urgency level of the user;

determining a speech rate of the second response on the basis of the urgency level of the user;

outputting the second response on the basis of the speech rate by synthesizing the second response to a voice signal;

receiving a voice command of the user as feedback for the second response output in the voice signal; and modifying the obtaining of the main vocabularies and the deriving of the urgency level according to whether or not the voice command input as the feedback relates to the main vocabularies of the first response but excluded in the second response.

2. The method of claim 1, wherein the prestored user information includes information on a user's schedule, and the deriving of the urgency level of the user includes: calculating the urgency level of the user by using at least one of the user's intention, a sound feature of the voice command, and a relation between the information on the user's schedule and current time.

3. The method of claim 2, wherein the deriving of the urgency level of the user includes: calculating the urgency level of the user by using factors and weighting factors respectively assigned to the user's intention, the sound feature of the voice command, and the relation between the information on the user's schedule and the current time.

4. The method of claim 2, wherein the using of the sound feature of the voice command includes: using a result obtained by comparing a prestored speech feature of a general voice command of the user and a speech feature of the voice command.

5. The method of claim 1, wherein the analyzing of the generated utterance includes: determining whether the utterance corresponds to a repeat-response type or a general-response type on the basis of a number of input times of the utterance, and the generating of the first response includes: when the utterance corresponds to the repeat-response type, generating a prestored response in association with the utterance as the first respon se.

6. The method of claim 5, wherein the generating of the second response includes: when the utterance corresponds to the repeat-response type, generating the second response by selecting one of a plurality of sentences having the same meaning with lengths different with each other on the basis of the urgency level of the user.

7. The method of claim 1, wherein the obtaining of the main vocabularies includes: determining rankings for vocabularies included in the first response according to an importance level, and performing classification on the vocabularies included in the first response.

8. The method of claim 1, wherein the determining of the speech rate of the second response on the basis of the urgency level of the user includes: increasing the speech rate of the second response when the urgency level of the user is high.

9. A non-transitory computer-readable medium storing a program comprising instructions for performing, when executed by at least one processor, the method of claim 1.

10. An apparatus for performing voice recognition by using artificial intelligence, the apparatus comprising:

a microphone configured to receive a voice command from a user;

a processor configured to generate an utterance by processing the voice command, and generate a response in association with the generated utterance; and a speaker configured to output the response, wherein the processor implements:

an intention analysis module configured to obtain a user's intention by analyzing the utterance;

an urgency deriving module configured to derive an urgency level of the user on the basis of the generated utterance and prestored user information;

a response generation module configured to generate a first response in association with the user's intention, obtain main vocabularies included in the first response, and generate a second response on the basis of the obtained main vocabularies and the urgency level of the user; and a voice synthesis module configured to determine a speech rate of the second response on the basis of the urgency level of the user, and provide a voice signal having the determined speech rate to the audio output unit by synthesizing the second response to the voice signal, wherein the microphone is further configured to receive a voice command from the user as feedback for the second response output in the voice signal, and wherein the urgency deriving module and the response generation module are configured to respectively modify the obtaining of the main vocabularies and the deriving of the urgency level according to whether or not the voice command input as the feedback to the response generation module relates to the main vocabularies of the first response which are excluded when generating the second response.

11. The apparatus of claim 10, wherein the prestored user information includes information on a user's schedule, and the urgency deriving module calculates the urgency level of the user by using at least one of the user's intention, a sound feature of the voice command, and a relation between the information on the user's schedule and current time.

12. The apparatus of claim 11, wherein the urgency deriving module is further configured to calculate the urgency level of the user by using factors and weighting factors respectively assigned to the user's intention, the sound feature of the voice command, and the relation between the information on the user's schedule and the current time.

13. The apparatus of claim 11, wherein the urgency deriving module is further configured to obtain the sound feature of the voice command by using a result obtained by comparing a prestored speech feature of a general voice command of the user and a speech feature of the voice command.

14. The apparatus of claim 10, wherein the intention analysis module is further configured to determine whether the utterance corresponds to a repeat-response type or a general-response type on the basis of a number of input times of the utterance, and wherein the response generation module is further configured to generate the first response by using a prestored response in association with the utterance when the utterance corresponds to the repeat-response type.

15. The apparatus of claim 14, wherein the response generation module is further configured to generate the second response by selecting one of a plurality of sentences having the same meaning with lengths different with each other on the basis of the urgency level of the user when the utterance corresponds to the repeat-response type.

16. The apparatus of claim 10, wherein the response generation module is further configured to determine rankings for vocabularies included in the first response according to an importance level, and perform classification on the vocabularies included in the first response.

17. The apparatus of claim 10, wherein the voice synthesis module is further configured to increase the speech rate of the second response when the urgency level of the user is high.

* * * * *